June 4, 1963          G. W. DROESKE          3,092,398

TRACTOR-TRAILER WHEEL STEERING ASSEMBLY

Filed Aug. 18, 1961          2 Sheets-Sheet 1

INVENTOR.
GORDON W. DROESKE

BY Oberlin, Maky & Donnelly

ATTORNEYS

June 4, 1963   G. W. DROESKE   3,092,398
TRACTOR-TRAILER WHEEL STEERING ASSEMBLY
Filed Aug. 18, 1961   2 Sheets-Sheet 2

INVENTOR.
GORDON W. DROESKE
BY
Oberlin, Maky & Donnelly
ATTORNEYS

United States Patent Office 3,092,398
Patented June 4, 1963

3,092,398
TRACTOR-TRAILER WHEEL STEERING ASSEMBLY
Gordon W. Droeske, 35560 Stevens Blvd., Eastlake, Ohio
Filed Aug. 18, 1961, Ser. No. 132,456
8 Claims. (Cl. 280—426)

This invention relates generally, as indicated, to a tractor-trailer and more particularly to a tractor-trailer combination especially suitable for hauling extremely heavy loads such as coil steel.

When hauling such heavy loads, it is often advisable to have a set of wheels near the middle of the trailer between the draw pin and the rear tandem. This more evenly distributes the load on the various wheel axles and prevents the frame from buckling or sagging. Such wheels are often rigidly connected to the frame or to the rear tandem and such additional wheel mountings makes the trailer exertmely hard to maneuver when backing into a loading platform or going around a corner. The tires of the middle unit tend to scrape or skew sideways and this generally results in the tires being chewed to pieces in a relatively short time. Since large truck tires are a rather expensive item, it is therefore desirable that the advantages of the additional wheel unit be retained while precluding the side wiping action of such tires in the unit over the highway or surface.

It is accordingly a principal object of the present invention to provide a tractor-trailer unit wherein the trailer has an intermediate set of wheels which will be turned with the tractor so that excessive side wiping action of the wheels of such unit will be avoided.

It is another main object to provide a trailer unit having wheel support means which will thus be turned with the tractor fifth wheel and yet which cannot be turned excessively to cause the tractor-trailer to jack-knife or upset.

It is a further object to provide a trailer unit having pivotally mounted wheel support means which can readily and easily be connected to the tractor fifth wheel for guidance through a predetermined limited arcuate movement.

It is a still further object to provide a tractor-trailer unit wherein the tractor serves to guide the wheel assembly on the trailer through only a certain portion of the arcuate swinging movement therein and after such portion permits complete freedom or overplay.

Yet another object is to provide a wheel unit for a trailer which may be guided through a limited arcuate swinging movement but which will be positively stopped to prevent the jack-knife effect of the wheels and trailer.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
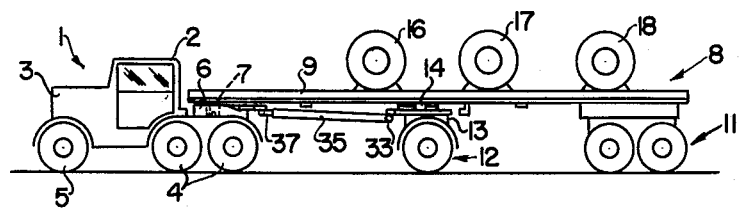
FIG. 1 is a side elevation of a tractor-trailer in accordance with the present invention.

Referring now to the annexed drawing and more particularly to FIG. 1, there is shown a tractor-trailer in accordance with the present invention. The tractor 1 may be generally conventional and comprises a cab 2, a prime mover 3 driving tandem wheels 4 and the front steering wheel 5. A frame bed to the rear of the cab supports a fifth wheel 6 which is generally horizontally pivotally mounted on such frame bed. The fifth wheel 6, shown in more detail in FIGS. 4 and 5, receives the draw pin 7 of the trailer unit. 8. The draw pin 7 extends downwardly at the leading end of the trailer frame 9 and fits in the crotch or bight portion of a V-shape opening 10 in the fifth wheel 6. A conventional latching mechanism will be employed to lock the draw pin in the fifth wheel of the tractor.

The trailer 8 may include a rear tandem 11 supporting the rear of the trailer and an intermediate set of wheels 12, the support frame 13 of which is pivotally connected to the underside of the trailer frame 9 as shown at 14. Suitable wear plates or the like may be employed between the wheel unit frame 13 and the bottom of the trailer frame 9 so that the trailer will be capable of supporting extremely heavy loads such as the rolls of coil steel shown at 16, 17 and 18. The frame may be rigidified in the conventional manner by marginal channel members 20 and suitable cross framing members 21 to provide a rigid flat bed for the support of such objects such as the illustrated rolls of strip steel.

Figure 2:
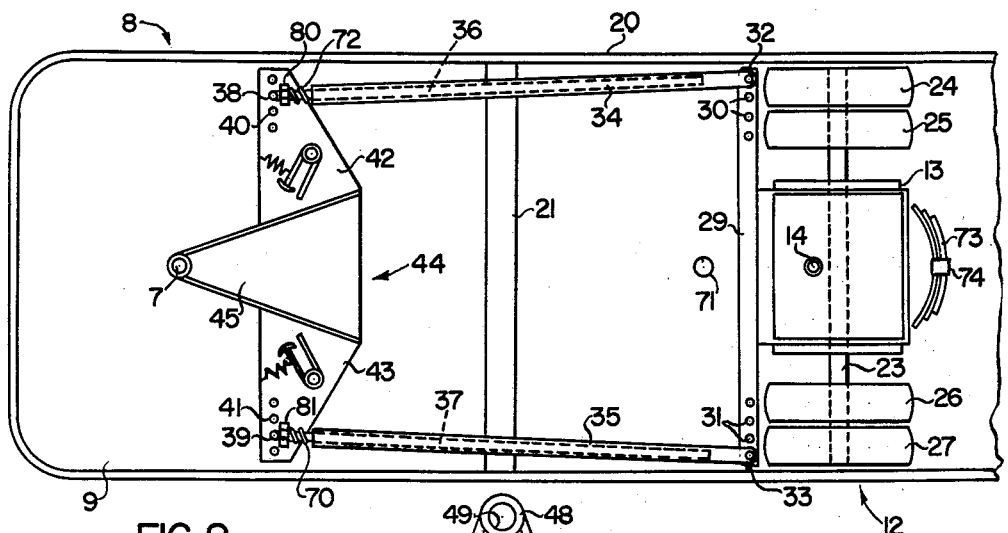
FIG. 2 is a fragmentary bottom plan view of the front end only of the trailer on an enlarged scale.
Figure 3:
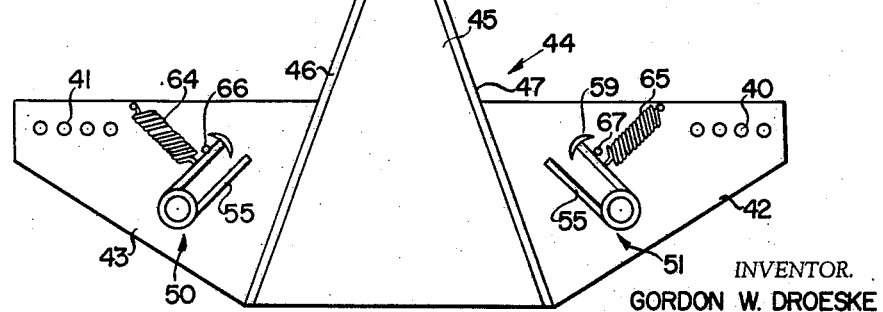
FIG. 3 is a detail view of the cross frame unit of the present invention which is attachable to the draw pin of the trailer.
Figure 4:
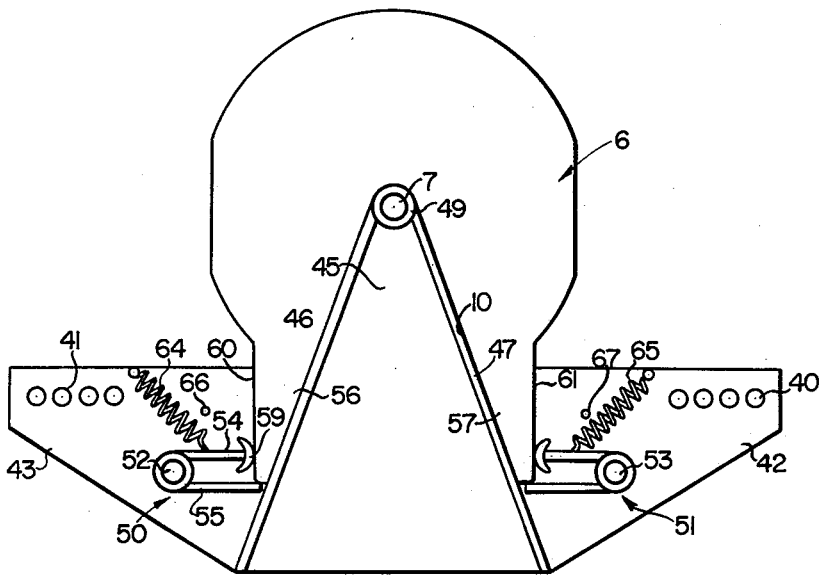
FIG. 4 is a view similar to FIG. 3 showing such cross frame unit locked to the tractor fifth wheel.

Referring now additionally to FIGS. 2, 3 and 4, it will be seen that the intermediate wheel unit 12 may comprise an axle 23 rotatably supporting four wheels 24, 25, 26 and 27 with the frame 13 being pivoted to the trailer body at 14 ahead of the axle axis whereby a castering effect will be obtained. In this manner, whenever the trailer is pulled forwardly or to the left as seen in FIG. 2, the intermediate wheels will always tend to straighten out. A cross bar 29 is secured to the front of the frame 13 and extends above and in front of the wheels 24-27. At each end of the cross bar, there is provided a plurality of spaced sockets 30 and 31 adapted pivotally to receive the ball joint ends 32 and 33 of elongated tubular members 34 and 35. These tubular members freely slidably receive elongated rods 36 and 37 which are connected by ball joints 38 and 39 in selected sockets of laterally spaced groups 40 and 41 in the wings or laterally extending arms 42 and 43 of cross frame member 44. Such cross frame member includes a center V-shape portion 45 which may be reinforced by two side rigidifying frame members 46 and 47 having a sleeve 48 secured to the apex thereof. The sleeve 48 has a central opening 49 therein which accommodates the downwardly extending draw pin 7.

Spring loaded latch mechanisms 50 and 51 may be mounted on the respective wings 43 and 42 to serve properly to hold and latch the V-shape extension of the cross frame member 44 in the V-shape opening 10 of the fifth wheel 6. Such latch members are mounted on pivot pins 52 and 53 and include generally parallel legs 54 and 55 with the leg 55 being somewhat longer and adapted to engage the ends of extensions 56 and 57 on the fifth wheel 6. The other leg 54 on each of the locking members is provided with an arcuate contacting shoe 59 adapted to contact the outer edges 60 and 61 of the extensions 56 and 57. In operation, as the tractor is backed into position to be latched to the trailer, the V-shaped portion 45 pivotally mounted on the draw pin 7 will be guided into the V-shape opening in the fifth wheel and the tips of the extensions 56 and 57 will contact the arm 55 pivoting the locking members about the pivots 52 and 53 causing the contact shoes on the other arms 54 to contact the side edges of the fifth wheel shown at 60 and 61 thus to center and hold the fifth wheel. Each of the latching mechanisms 50 and 51 may be held by springs 64 and 65 against stop pins 66 and 67 in the non-operating position as shown in FIG. 3. It will, of course, be understood that any sort of locking means may be employed to hold the cross frame to the draw pin 7 such as a cotter pin, lock washer or the like. In any event, the cross frame member is freely pivotally mounted on the draw pin 7 and when the fifth wheel is in position and latched to the draw pin, it will be firmly centered and locked for movement with the cross frame member so that the entire unit shown in FIG. 4 will pivot about the draw pin 7 and move with the tractor. With the latch members 50 and 51, it will readily be seen that the cross frame will fit in fifth wheel members of different sizes with the stop 59 on each of the latch members holding the draw frame for movement with the fifth wheel.

Figure 5:
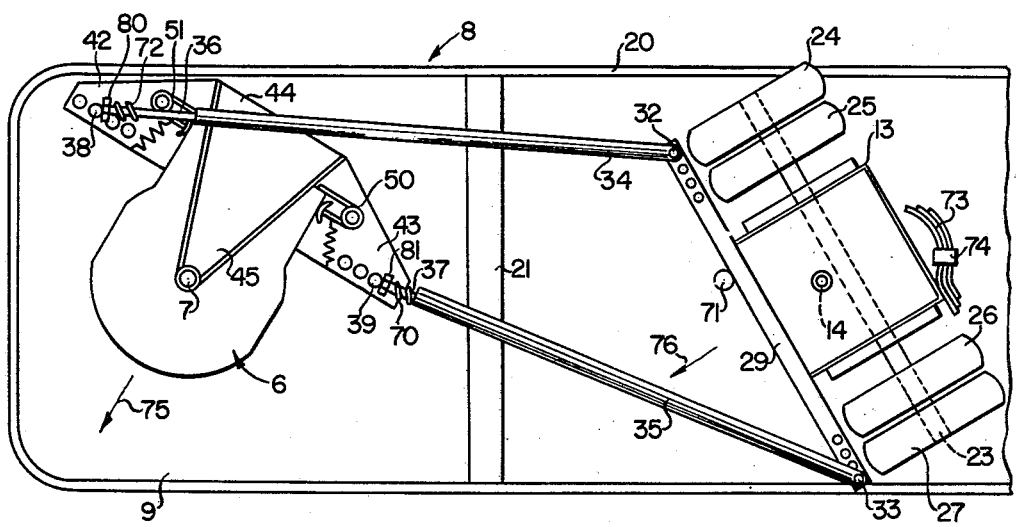
FIG. 5 is a view similar to FIG. 2 illustrating the manner in which the turning of the tractor fifth wheel controls the turning of the trailer wheel unit through a limited arcuate movement only.

Referring now to FIG. 5, in operation, when the tractor-trailer unit is going around sharp corners or is being backed into position at an unloading platform or the like, it may be necessary to place the tractor at a sharp angle with respect to the trailer and in this manner, the fifth wheel will pivot to a position such as that shown in FIG. 5. As the fifth wheel pivots, the cross frame 44 held thereto will pivot likewise and the pivots 38 and 39 will then pivot about the draw pin as a center. As the pivot 39 starts to move counterclockwise as shown in FIG. 5, it will cause the end or pivot 33 of the cross bar 29 also to pivot the entire wheel frame 13 about the pivot 14. A bumper spring 70 may be provided extending between the pivot 39 and the end of the tubular member 55 to cushion the initial shock load of the turning movement. The wheel frame will continue to turn with the cross frame member 44 which pivots with the fifth wheel 6 until the cross bar 29 contacts a stop 71. In this manner, the wheel frame 13 will be held in the position shown and yet the fifth wheel and the cross frame member may continue turning in a counterclockwise direction. As shown in FIG. 5, if the fifth wheel continues to turn, both the rods 36 and 37 will telescope out of the tubular members 34 and 35. The rod 36 is shown telescoped outwardly somewhat of the tubular member 34. A bumper spring 72 may also be provided on the rod 36. A leaf spring 73 may be fastened to the bottom of the trailer frame as shown at 74 to contact the opposite edge of the wheel frame 13 to provide also a stop with a cushioning effect. Thus when the tractor is moving around sharp corners in the direction of the arrow 75 in FIG. 5, the wheel frame 13 will be pivoted to cause the wheel to move in the direction of the arrow 76 in FIG. 5. In this manner, the wheels 24 through 27 will not be skewed or wiped sideways over the surface and the tires thereof will have a much longer life. Moreover, even though the wheels on the frame 13 are turned in the position indicated in FIG. 5, this will not preclude the tractor from extending completely normal to the axis of the trailer to facilitate backing or parking in close quarters. As soon as the tractor-trailer straightens out, the castering effect obtained by the position of the pivot 14 will assist in placing the frame back in the position shown in FIG. 2. It will, of course, be understood that the bumper springs may be employed inside the tubular members 34 and 35 between the ends of the rods 36 and 37 and the joints 32 and 33. Also, pin connections may be employed in place of the preferred ball joint connections for the link members.

If deisred, in order to prevent road vibrations, adjustable nuts 80 and 81 may be employed threaded on the ends of rods 36 and 37 bearing against bumper springs 70 and 72. In the FIG. 2 position, these nuts may be tightened to take up any slack or wear in the links 34, 36 and 35, 37.

It can now be seen that there is provided a tractor-trailer combination wherein the wheel means supporting the trailer is uniquely interconnected with the tractor fifth wheel whereby the wheel means will be conjointly turned with the fifth wheel through a predetermined limited arc only and beyond such extent of movement, the fifth wheel will be completely free to turn with respect to the trailer as well as the frame 13 supporting the wheels 24 through 27. Thus the means requiring conjoint movement through a predetermined arc permits an overplay allowing the fifth wheel 6 to turn completely independently of the turning movement of the frame 13.

Other modes of applying the principle of the invention may be employed, change being made as regards the details described, provided the features stated in any of the following claims or the equivalent of such be employed.

I, therefore, particularly point out and distinctly claim as my invention:

1. In combination, a tractor having a fifth wheel, a trailer, wheel means supporting said trailer, means interconnecting said tractor fifth wheel and said wheel means for conjoint turning movement through a predetermined limited arc, and stop means thus to limit the turning of said wheel means while not affecting the turning of said fifth wheel, said interconnecting means comprising a pair extensible link means eccentrically disposed with respect to the center of said fifth wheel on opposite sides thereof.

2. The combination set forth in claim 1 including a cross frame member mounted on said trailer for turning movement about a downwardly extending draw pin thereof, and means to lock said cross frame member with said fifth wheel for turning movement therewith about said draw pin.

3. A trailer for hauling heavy objects comprising a frame, a downwardly projecting trailer draw pin adapted to be locked in a tractor fifth wheel, pivotally mounted wheel means supporting said trailer spaced rearwardly of said draw pin, a cross frame, means pivotally connecting said cross frame to said draw pin, means on said cross frame adapted to lock said cross frame to such tractor fifth wheel for turning movement therewith, means interconnecting said wheel means and said cross frame for conjoint turning movement through a predetermined limited arc while not limiting complete turning movement of such tractor fifth wheel, frame means supporting said pivotally mounted wheel means, a cross bar connected to said frame means, and extensible links interconnecting the opposed ends of said cross bar and said cross frame member.

4. A trailer as set forth in claim 3 including stop means limiting the arcuate movement of said frame means and thus said wheel means.

5. A trailer as set forth in claim 4 wherein said lock means comprise pivotally mounted spring loaded latch members adapted to be moved into centering position by engagement of such fifth wheel with said cross frame member.

6. In combination, a tractor having a fifth wheel, a trailer, wheel means supporting said trailer, means interconnecting said tractor fifth wheel and said wheel means for conjoint turning movement through a portion only of the turning movement of said fifth wheel, said interconnecting means comprising a pair of pusher bars eccentrically pivotally connected to said fifth wheel on opposite sides thereof and connected to said wheel means, said pusher bars being extensible thus only to pivot said wheel means through a limited arcuate swinging movement.

7. In combination, a tractor having a fifth wheel, a trailer, wheel means supporting said trailer, means interconnecting said tractor fifth wheel and said wheel means for conjoint turning movement through a predetermined limited arc, stop means thus to limit the turning of said wheel means while not affecting the turning of said fifth wheel, frame means supporting said wheel means, a cross bar on said frame means, and extensible link means connected to the ends of said frame means operable to push on the ends of said cross bar thus to turn said frame and wheel means.

8. In combination, a tractor having a fifth wheel, a trailer, wheel means supporting said trailer, means interconnecting said tractor fifth wheel and said wheel means for coinjoint turning movement through a predetermined limited arc, and stop means thus to limit the turning of said wheel means while not affecting the turning of said fifth wheel, said interconnecting means including a substantially parallelogram linkage means interconnecting said tractor fifth wheel and said wheel means, said linkage means including extensible links adapted to elongate after said wheel means has been turned through a limited arc.

References Cited in the file of this patent
UNITED STATES PATENTS

| | | |
|---|---|---|
| 1,613,728 | Schneider et al. | Jan. 11, 1927 |
| 2,785,909 | Barnard | Mar. 19, 1957 |
| 2,925,285 | Haas | Feb. 16, 1960 |
| 2,959,428 | Felburn | Nov. 8, 1960 |